United States Patent
Achatz et al.

(10) Patent No.: US 12,228,679 B2
(45) Date of Patent: Feb. 18, 2025

(54) RADAR SYSTEM AND METHOD FOR PERFORMING VELOCITY ESTIMATION

(71) Applicant: Infineon Technologies AG, Neubiberg (DE)

(72) Inventors: Simon Achatz, Munich (DE); Maximilian Eschbaumer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 336 days.

(21) Appl. No.: 17/730,225

(22) Filed: Apr. 27, 2022

(65) Prior Publication Data

US 2023/0350013 A1    Nov. 2, 2023

(51) Int. Cl.
*G01S 7/35* (2006.01)
*G01S 7/41* (2006.01)
*G01S 13/931* (2020.01)

(52) U.S. Cl.
CPC .............. *G01S 7/356* (2021.05); *G01S 7/41* (2013.01); *G01S 13/931* (2013.01)

(58) Field of Classification Search
CPC .................................................... G01S 13/582
See application file for complete search history.

(56) References Cited

U.S. PATENT DOCUMENTS

| | | | |
|---|---|---|---|
| 2009/0237292 A1* | 9/2009 | Tigrek | G01S 13/582 342/109 |
| 2020/0025906 A1* | 1/2020 | Kesaraju | G01S 13/931 |
| 2020/0225317 A1* | 7/2020 | Chen | G01S 7/417 |
| 2020/0233076 A1* | 7/2020 | Chen | G01S 13/584 |
| 2022/0057486 A1 | 2/2022 | Khairmode et al. | |
| 2022/0404455 A1 | 12/2022 | Liu et al. | |
| 2023/0066386 A1 | 3/2023 | Kim et al. | |

OTHER PUBLICATIONS

Office Action of corresponding U.S. Appl. No. 17/730,212, dated Jun. 11, 2024, 21 pages (for informational purposes).

* cited by examiner

*Primary Examiner* — Bernarr E Gregory
(74) *Attorney, Agent, or Firm* — Viering, Jentschura & Partner mbB

(57) ABSTRACT

According to various embodiments, a radar system is described comprising a radar receiver configured to receive radio signals, a range Fourier transform stage configured to generate, for each of a plurality of chirps, a vector of range Fourier transform coefficients, a machine learning model configured to generate, for each of one or more additional chirps, a vector of range Fourier transform coefficients from the vectors of Fourier transform coefficients generated for the plurality of chirps, and an object detector configured to perform velocity estimation of one or more detected objects using the Fourier transform coefficients generated by the machine learning model.

18 Claims, 16 Drawing Sheets

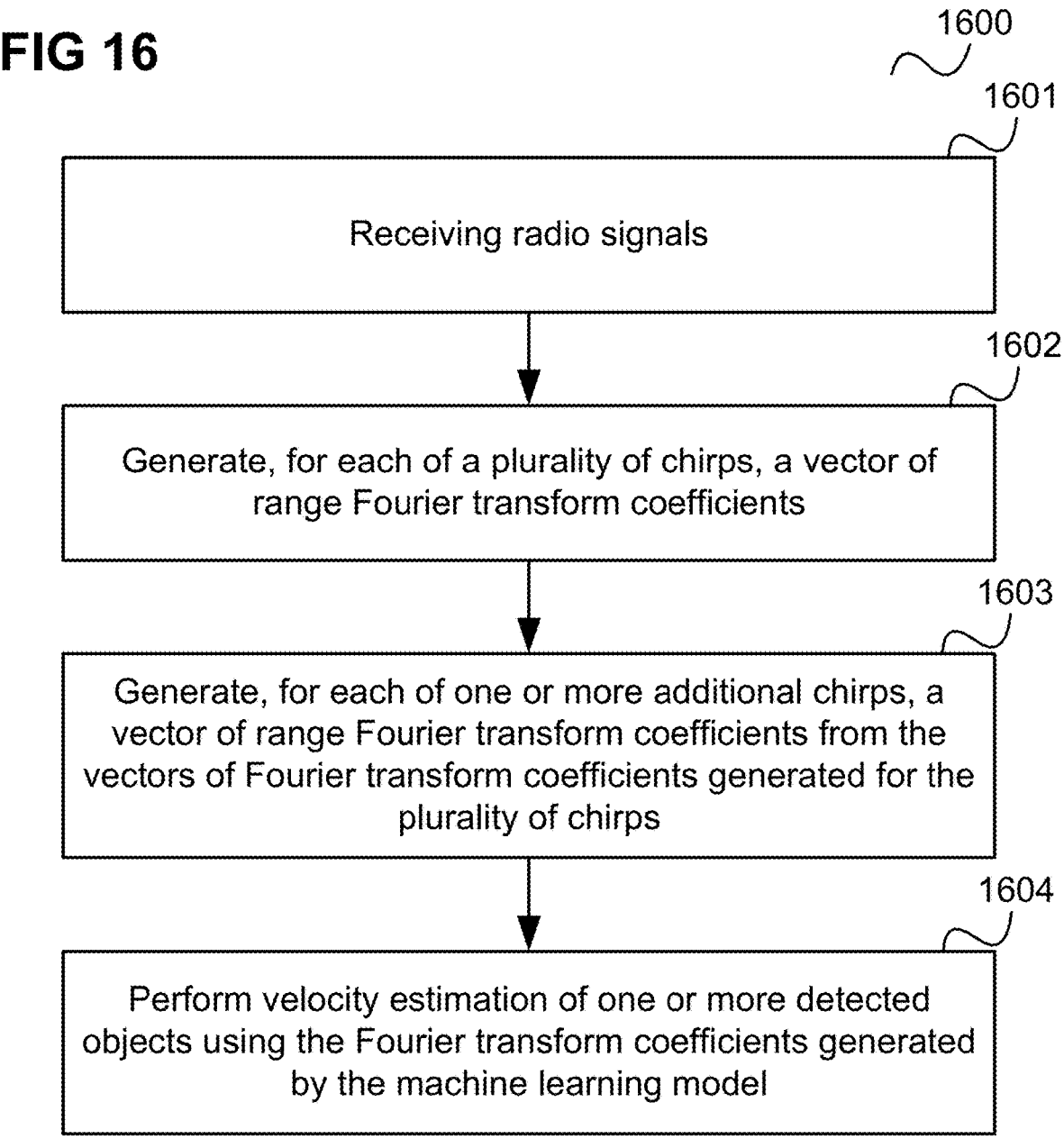

RADAR SYSTEM AND METHOD FOR PERFORMING VELOCITY ESTIMATION

TECHNICAL FIELD

Exemplary implementations described herein generally relate to radar systems and methods for performing velocity estimation in a radar system.

BACKGROUND

A radar system which receives radar signals for a plurality of chirps allows the determination of velocity of a detected object from the radar signals which have been received. The higher the number of chirps is for which radar signals are received, the more accurate the velocity determination is (i.e. the higher the resolution of the velocity determination can be). However, the number of chirps is limited, mostly by the available memory on the device (e.g. microcontroller) which performs the processing.

Therefore, approaches are desirable that allow achieving a high velocity determination performance in a radar system with a limited number of chirps.

SUMMARY

According to various embodiments, a radar system is provided including a radar receiver configured to receive radio signals, a range Fourier transform stage configured to generate, for each of a plurality of chirps, a vector of range Fourier transform coefficients, a machine learning model configured to generate, for each of one or more additional chirps, a vector of range Fourier transform coefficients from the vectors of Fourier transform coefficients generated for the plurality of chirps, and an object detector configured to perform velocity estimation of one or more detected objects using the Fourier transform coefficients generated by the machine learning model.

According to a further embodiment, a method for performing velocity estimation according to the above radar system is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 16 shows a flow diagram illustrating a method for performing velocity estimation in a radar system.

DESCRIPTION OF EXEMPLARY IMPLEMENTATIONS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
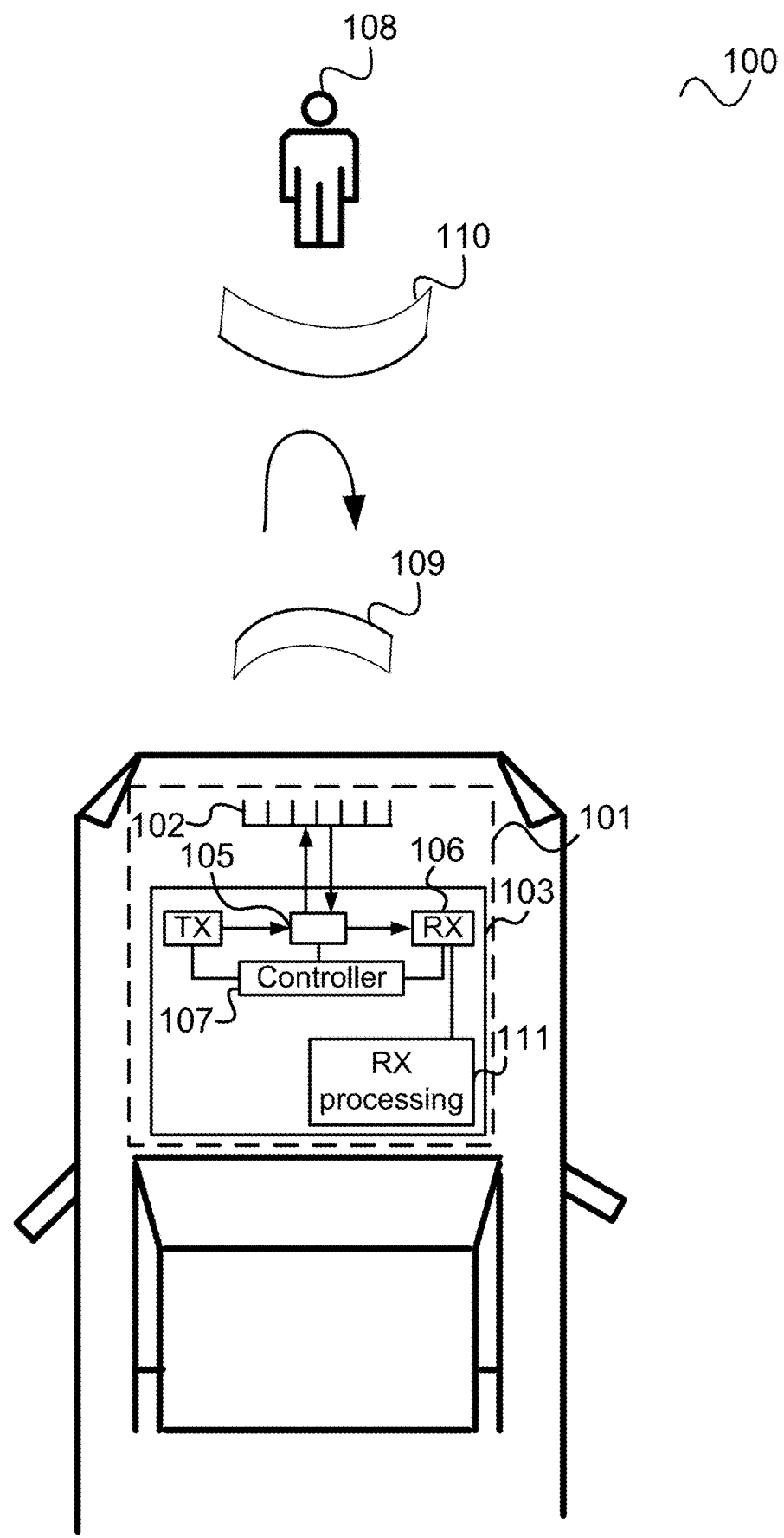
FIG. 1 shows a radar arrangement.

FIG. 1 shows a radar arrangement 100.

The radar arrangement 100 includes a radar device (implementing a radar system) 101 that includes an antenna arrangement 102 and a radar control device 103. It should be noted that, while the radar system is in this example implemented by a radar device 101, the radar system may be also implemented by an arrangement of devices, e.g. including an electronic control unit (ECU) or a vehicle controller and/or a device (or arrangement) implementing an Advanced Driver Assistance Systems (ADAS).

The radar control device 103 includes one or more (radar) transmitters 104, a duplexer 105 (i.e. a circuit to separate transmitted signals from received signals), a (radar) receiver 106 and a controller 107. The radar arrangement may include multiple transmit antennas in form of a transmit antenna array and multiple receive antennas in form of a receive antenna array.

For the detection of an object 108, the controller 107 controls the one or more transmitters 104, the duplexer 105 and the receiver 106 as follows:

1. The one or more transmitters 104 transmit a transmit signal 109 via the antenna arrangement 102.
2. The transmit signal 109 is reflected by a target (object) 108;
3. The radar device 101 receives the echo 110 of the transmitted signal as receive signal.

From the received signal, the radar control device 103 (e.g. a radar signal processing circuit 111) calculates information about position and speed of the object 108.

For example, the radar device 101 may be installed in a vehicle for detection of nearby objects, in particular for autonomous driving.

The transmit signal 109 may include a plurality of pulses. Pulse transmission includes the transmission of short high-power bursts in combination with times during which the radar device 101 listens for echoes 110. This is typically not optimal for a highly dynamic situation like in an automotive scenario.

Therefore, a continuous wave (CW) may instead be used as transmit signal. Since a continuous wave only allows velocity determination, but does not provide range information (due to the lack of a time mark that could allow distance calculation) an approach is frequency-modulated continuous wave (FMCW) radar or phase-modulated continuous wave (PMCW) radar.

Figure 2:
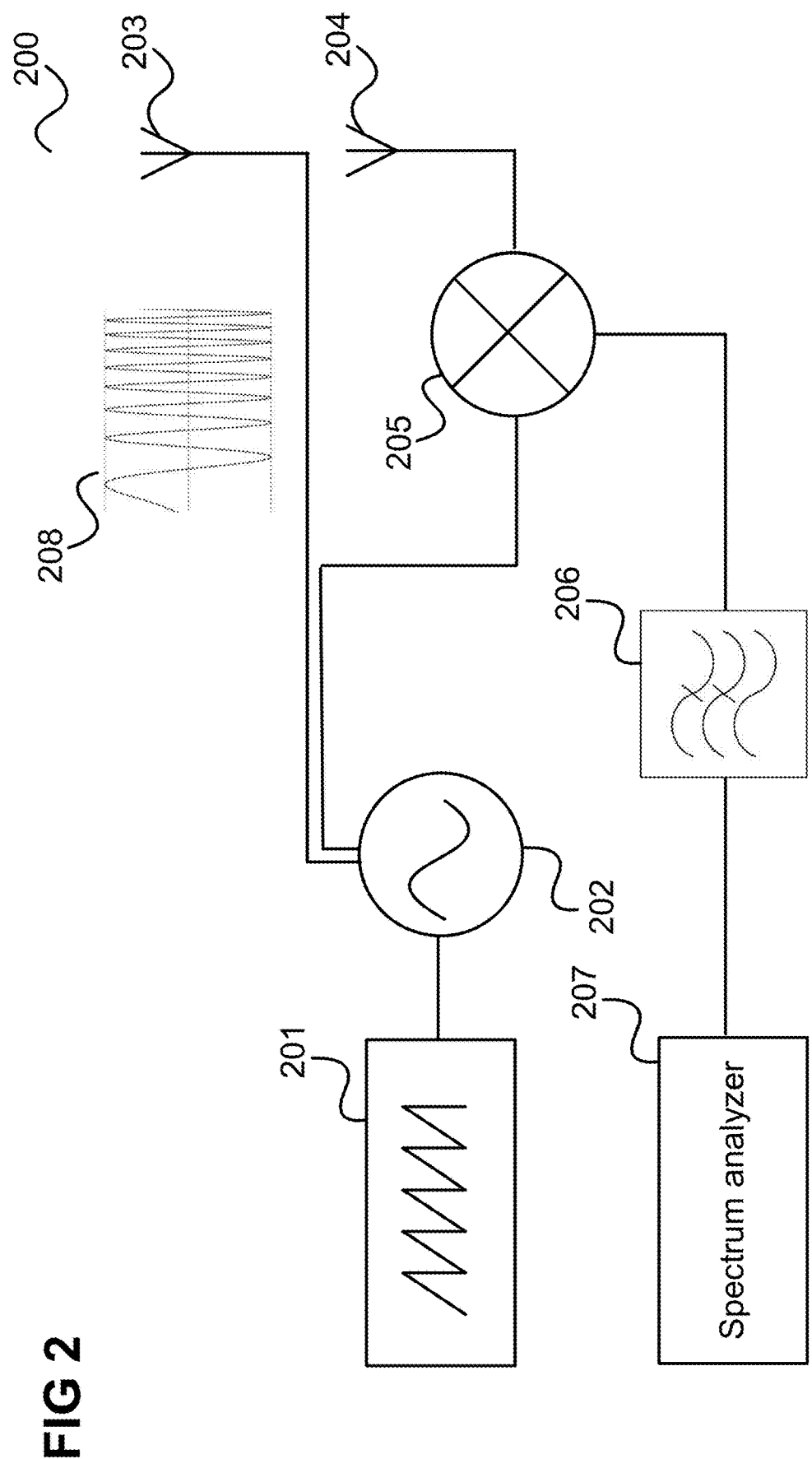
FIG. 2 illustrates an FMCW (Frequency Modulated Continuous Wave) radar system.

FIG. 2 illustrates an FMCW radar system 200.

In an FMCW radar system, rather than sending a transmit signal with a constant frequency, the frequency of the transmit signal is periodically ramped up and reset according to a saw tooth (or alternatively a triangle) waveform 201. The saw tooth waveform 201 may for example be generated by a ramping circuit (or "ramper"). The saw tooth waveform 201 frequency-modulates an oscillator 202 and the resulting transmit signal is fed to a transmit antenna 203 (by means of a radio frequency (RF) frontend).

A receive antenna 204 receives the echo of the transmit signal (in addition to noise etc.) as receive signal. A mixer 205 mixes the transmit signal with the receive signal. The result of the mixing is filtered by a low pass filter 206 and processed by a spectrum analyzer 207.

The transmit signal has the form of a sequence of chirps (or "ramps"), which are result of the modulation of a sinusoid with the saw tooth waveform 201. One single chirp 208 corresponds to the sinusoid of the oscillator signal frequency-modulated by one "tooth" of the saw tooth waveform 201 from the minimum frequency to the maximum frequency.

As will be described in detail further below, the spectrum analyzer 207 (e.g. implemented by radar signal processing circuit 111) performs two FFT (Fast Fourier Transform) stages to extract range information (by a first stage FFT, also denoted as range FFT) as well as velocity information (by a second stage FFT, also denoted as Doppler FFT) from the receive signal. It should be noted that the spectrum analyzer 207 works on digital samples so an A/D (analog-to-digital) conversion is included in the path from the receive antenna 204 to the spectrum analyzer 207. For example, the filter 206 is an analog filter and an analog-to-digital converter (ADC) is arranged between the filter 206 and the spectrum analyzer 207. At least some of the various components of the receive path may accordingly be part of a digital or analog frontend.

To further allow determination of a direction of the object 108 with respect to the radar device 101, the antenna arrangement 101 may include a plurality of receive antennas, i.e. an array of receive antennas. The direction of an object 108 may then be determined from phase differences by which the receive antennas receive an echo from an object 110, for example by means of a third stage FFT (also denoted as angular FFT). Accordingly, a radar receiver may include a mixer 205, an analog filter 206 and an ADC for each receive antenna.

The signals received by a plurality of antennas may be processed by means of an MMIC (Monolithic Microwave Integrated Circuit).

Figure 3:
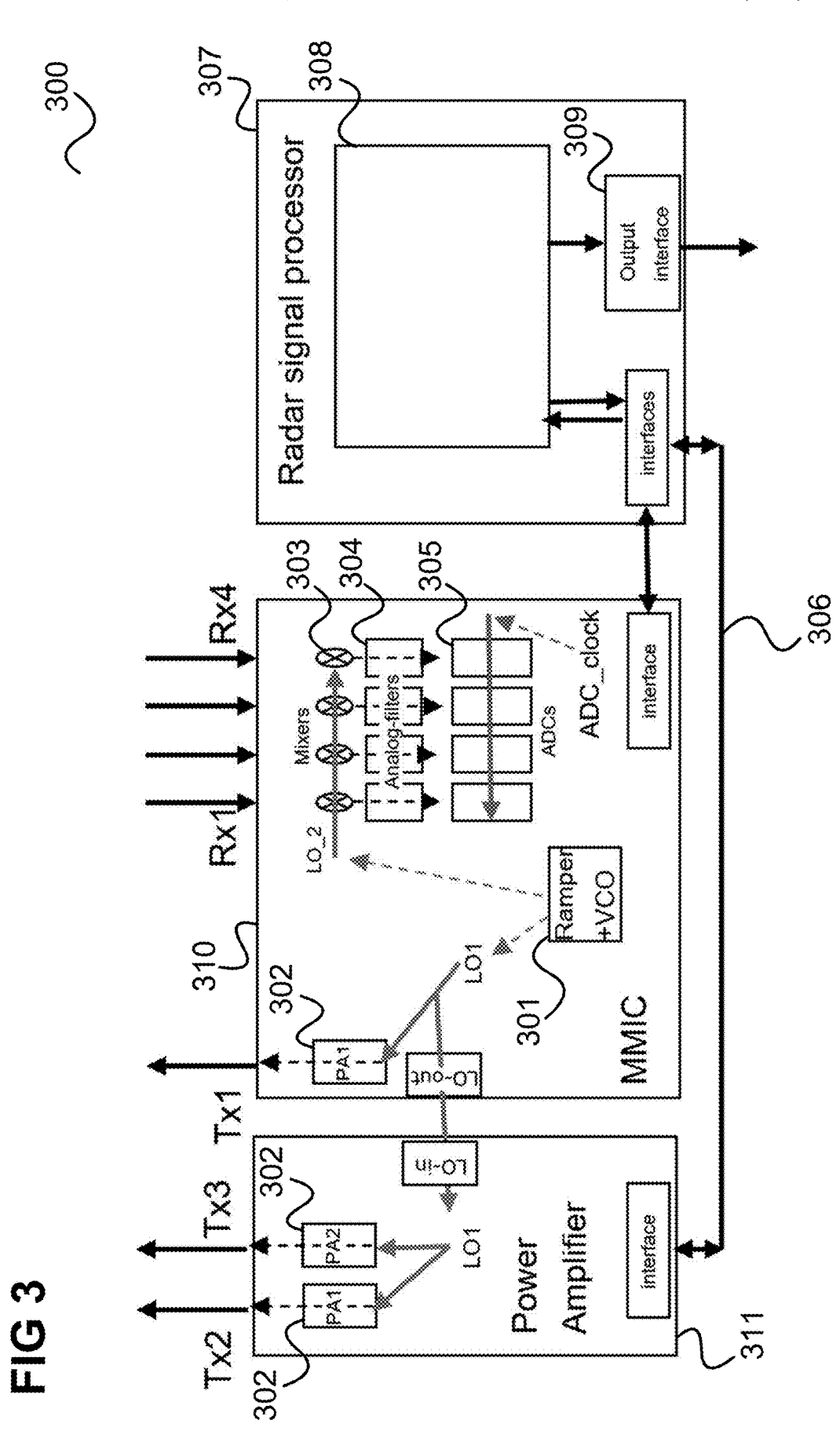
FIG. 3 shows a radar device having a plurality of transmit antennas and receive antennas.

FIG. 3 shows a radar device 300 having a plurality of transmit antennas and receive antennas.

The radar device 300 includes an MMIC 310 which includes a (voltage-controlled) oscillator with ramper 301 which supplies transmit amplifiers 302 (one for each transmit antenna) and mixers 303 with a transmit signal as described with reference to FIG. 2.

In the example of FIG. 3, two of the transmit amplifiers 302 are provided by a power amplifier 311 to which the transmit signal is provided via a transmit signal interface 312. However, the transmit amplifiers may also all be provided within the MMIC 310

There is one mixer 303 in the MMIC 310 for each receive antenna. Analog filters 304 (corresponding to filter 206) filter the mixed signals and analog-to-digital converters (ADCs) 305 generate digital signals from the filtered analog signals. The MMIC 310 transfers their output via a digital interface 306 to a radar signal processor 307.

The radar signal processor 307 has a radar signal processing circuit 308 (for example corresponding to the radar signal processing circuit 111), implements a spectrum analyzer and performs object detection and determination of direction of arrival as explained in the following with reference to FIG. 4.

Figure 4:
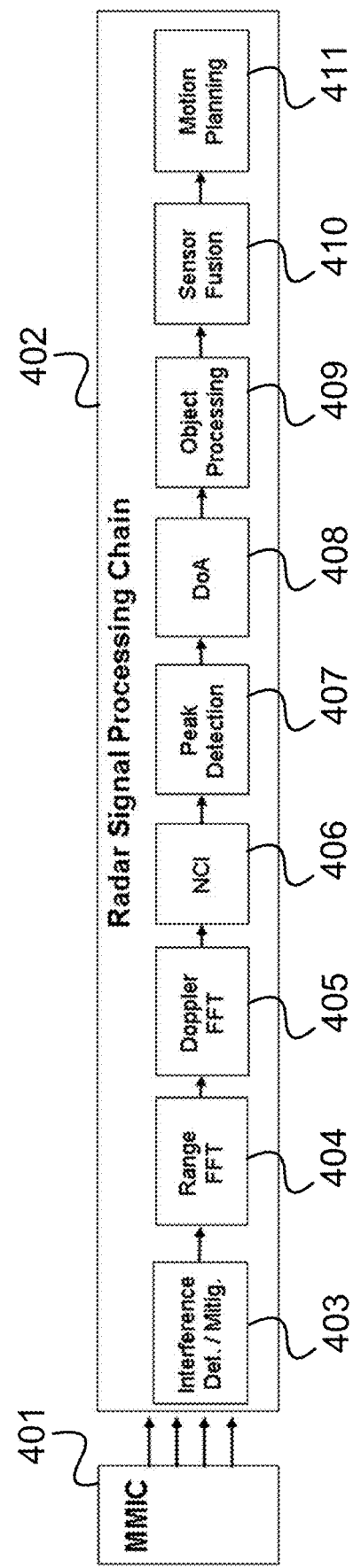
FIG. 4 illustrates the processing of radar signals.

FIG. 4 illustrates the processing of radar signals received using an MMIC 401.

The MMIC 401 is for example part of the receiver 106. The MMIC 401 is coupled with a plurality of antennas and is supplied with received signals from the respective plurality of antennas.

It should be noted that the number of receive signals that an MMIC may process in parallel is limited (and thus an MMIC can only serve a limited number of receive antennas), multiple MMICs may be used to allow using a higher number of receive antennas. In that case, there are multiple MMICs instead of the single MMIC 401 but the processing is similar.

The MMIC 401 performs processing of the received signals like amplification, frequency down conversion (i.e. for example the functionality of mixer 205 and filter 206) and A/D conversion. The MMICs may also implement the duplexer 105, i.e. may be configured to separate transmission signals from reception signals. The MMIC 401 supplies the resulting digitized receive signals to a radar signal processing chain 402 (e.g. implemented by radar signal processor 307).

The radar signal processing chain 402 performs interference detection and mitigation 403 on the digitized receive signals followed by a first FFT (Fast Fourier Transform) 404, also referred to as range FFT, and a second FFT 405, also referred to as Doppler FFT. Based on the outputs of the FFTs 404, 405 the radar signal processing chain 402 determines range information as well as velocity information (e.g. in form of a R/D (range-Doppler) map) for one or more objects in 407.

It should be noted that the output of the second FFT 405 is a two-dimensional FFT result (wherein one dimension corresponds to range and the other to velocity) for each antenna (namely based on the processing of the samples of the receive signal received by this specific antenna). The result of the first FFT 404 includes, for each receive antenna, a complex value for a range bin.

The second FFT 405 goes over the result of the first FFT 404 over multiple chirps, for each range bin, generating, per range bin, a complex value for each Doppler bin. Thus, result of the second FFT stage 405 includes, for each receive antenna, a complex value for each combination of Doppler bin and range bin (i.e. for each Doppler/range bin). This can be seen to give an antenna-specific R/D map.

In 406, to generate an aggregate R/D map, the radar processing chain 402 combines the MMIC-specific R/D maps, e.g. by summing them up, for example by coherent or non-coherent integration. In 407, it then estimates the velocity and range of specific objects by identifying peaks in the aggregate R/D map, e.g. by means of a CFAR (Constant False Alarm Rate) algorithm. It should be noted that since an FFT output consists in general of complex values, a peak selection in an FFT output (such as the aggregate R/D map) may be understood as a selection based on absolute values (i.e. complex magnitudes of the complex outputs) or power (i.e. squares of absolute values).

In 408, the radar signal processor 307 may further determine the direction of the one or more objects. This can be done based on the phase differences of the output values of the second stage FFT between different receive antennas and may include a third stage FFT (angular FFT).

Based on the results of this processing, further processing such as object classification, tracking, generation of an object list, e.g. including sensor fusion at some point, and decision-making (e.g. motion planning in autonomous driving) may be performed in 409, 410 and 411. This may at least partially be carried out by a further component such as a vehicle controller. For this, the radar signal processor 307 may output processing results via an output interface 309.

The digitized receive signals provided by the MMIC 401 are typically arranged in a data cube.

Figure 5:
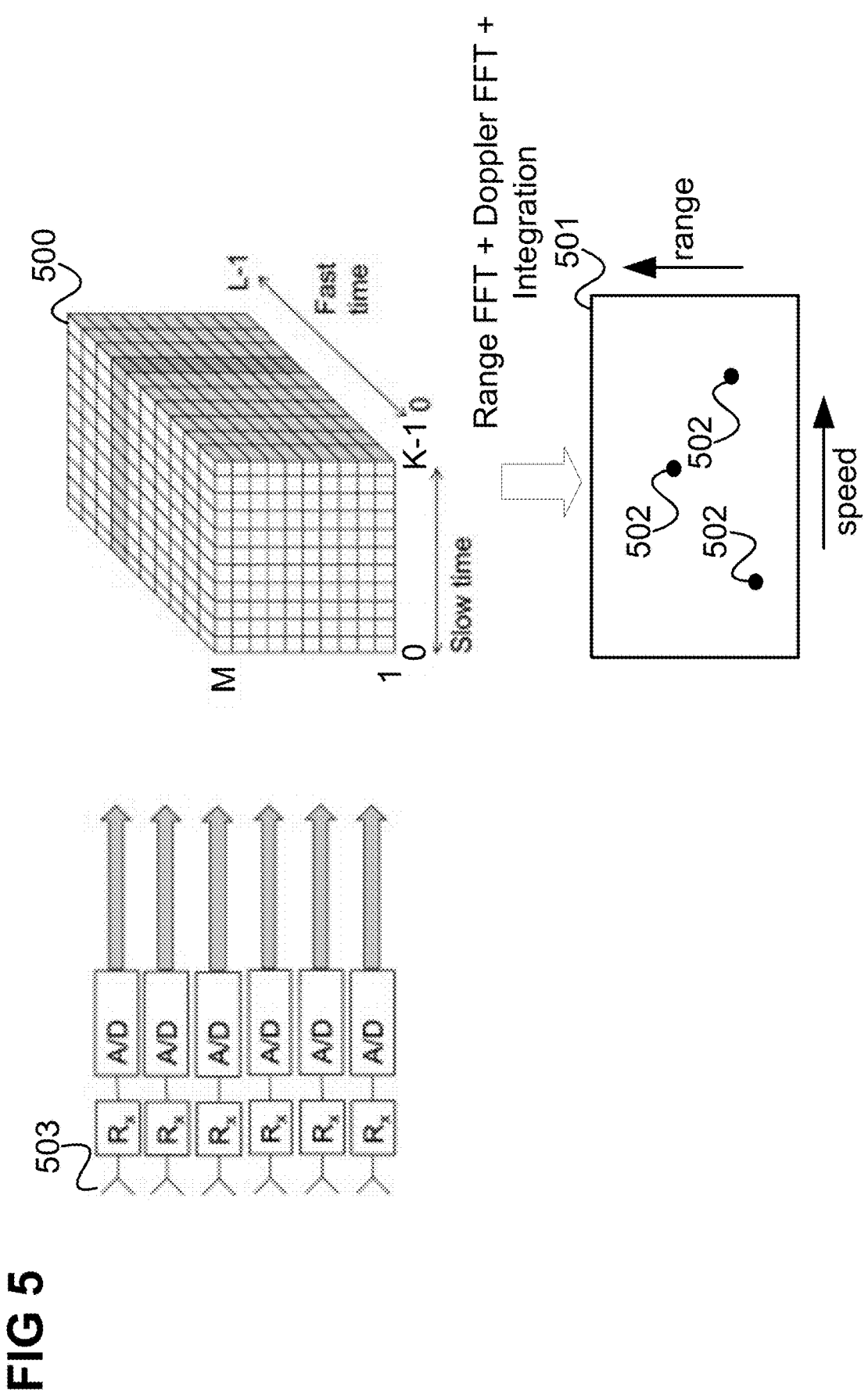
FIG. 5 shows a data cube.

FIG. 5 shows a data cube 500.

The data cube 500 includes digitized samples of receive signals from M antennas forming a receive antenna array 503. The MMIC 401 performs analog/digital conversion to generate the digitized samples.

For example, for each chirp, the received signal is sampled to have L samples (e.g. L=612).

The L samples collected for each chirp are processed by the first FFT 404.

The first FFT 404 is performed for each chirp and each antenna, so that the result of the processing of the data cube 500 by the first FFT 404 has again three dimensions and may have the size of the data cube 500 but does no longer have values for L sampling times but instead values for L range bins.

The result of the processing of the data cube 500 by the first FFT 404 is then processed by the second FFT 405 along the chirps (for each antenna and for each range bin).

The direction of the first FFT 404 is referred to as fast time whereas the direction of the second FFT 405 is referred as slow time.

The result of the second FFT 405 gives, when aggregated over the antennas (in 406), a range-Doppler (R/D) map 501 which has FFT peaks 502 (i.e. peaks of FFT output values (in terms of absolute values) for certain range/speed combinations (i.e. for certain range-Doppler bins) which the radar signal processor 307 expects to correspond to detected objects 108 (of a certain range and speed).

As explained above, in 405, a Doppler FFT is performed on the results of the range FFT over the slow time, i.e. the chirps, for velocity determination. In the aggregate R/D map, the Doppler bins in which peaks (detected in 406) are located indicate the velocities of the detected objects (the radar signal processing chain assumes each peak to correspond to a detected object). This means that the input to the Doppler FFT is the data cube 500 after processing it by the range FFT, i.e. with an FFT over fast time per chirp and per channel (i.e. per receive antenna or virtual receive antenna in case of a MIMO (multiple-input multiple output) radar). So, when considering only one receive antenna, the input vector to the Doppler FFT is, for each chirp, a vector of (range) Fourier coefficients (generated by the range FFT for that chirp). When the input vectors are put together in a matrix (e.g. in rows), the input to the Doppler FFT is (per channel) an input matrix.

Figure 6:
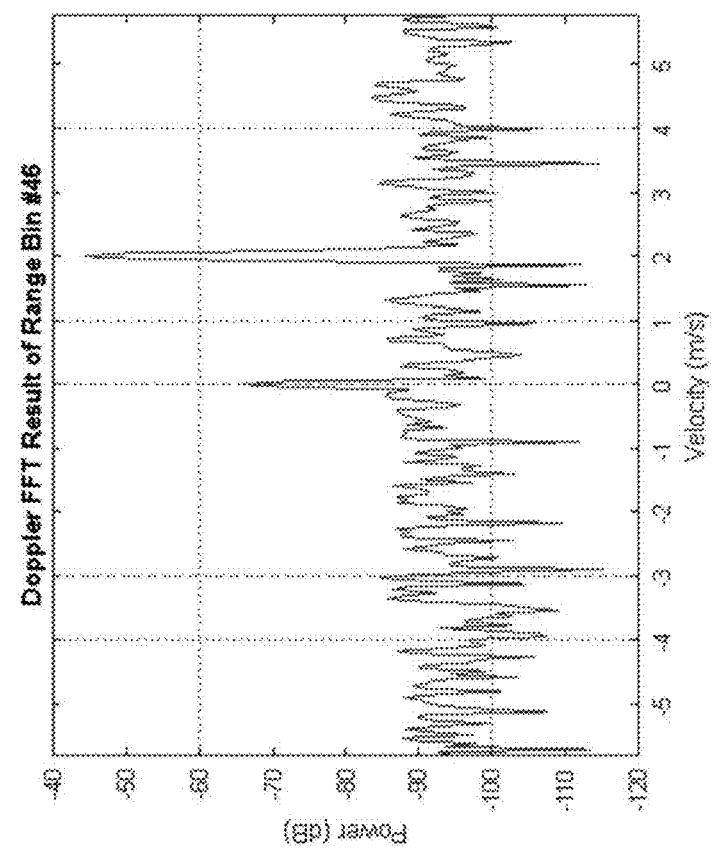
FIG. 6 shows a comparison of a Doppler FFT (Fast Fourier Transform) spectrum for 64 chirps and 256 chirps.
Figure 6:
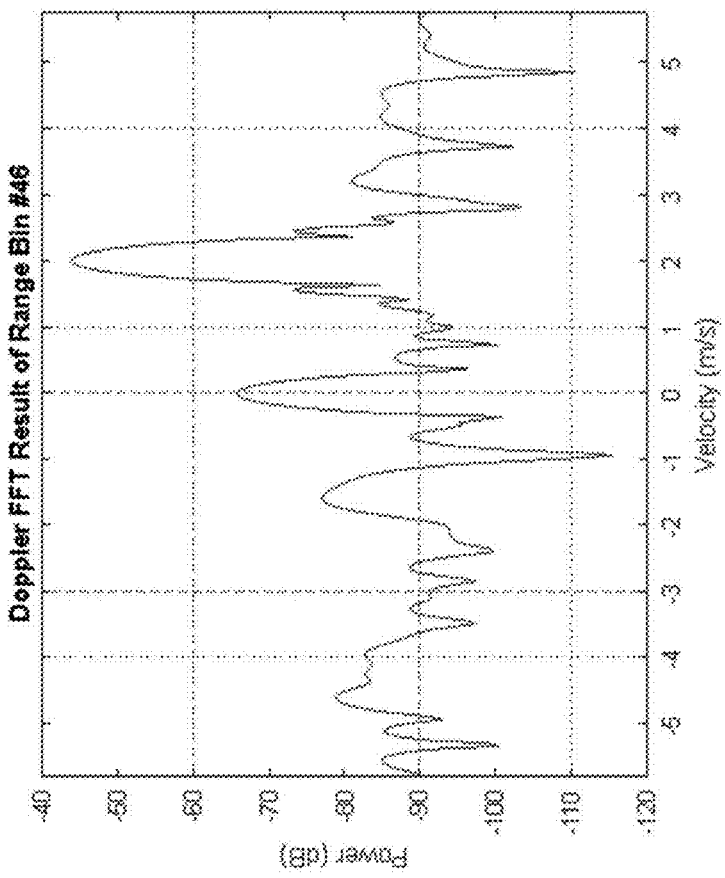

The radar system 101 has a certain velocity resolution in the velocity determination. The velocity resolution can be improved by increasing the integration times, i.e. the number of chirps. FIG. 6 shows a comparison of a Doppler FFT spectrum (in terms of power over velocity) for 64 chirps (first diagram 601) and 256 chirps (second diagram 602).

As illustrated, the lobes (or beams) become narrower with more chirps and velocity of targets (i.e. detected objects) can be better resolved. However, the number of chirps is typically limited, mostly due to the available memory of the device performing the respective processing, e.g. radar signal processor 307.

According to various embodiments, a machine learning model is used to increase velocity resolution by computing information for additional chirps (that are not actually transmitted).

Figure 7:
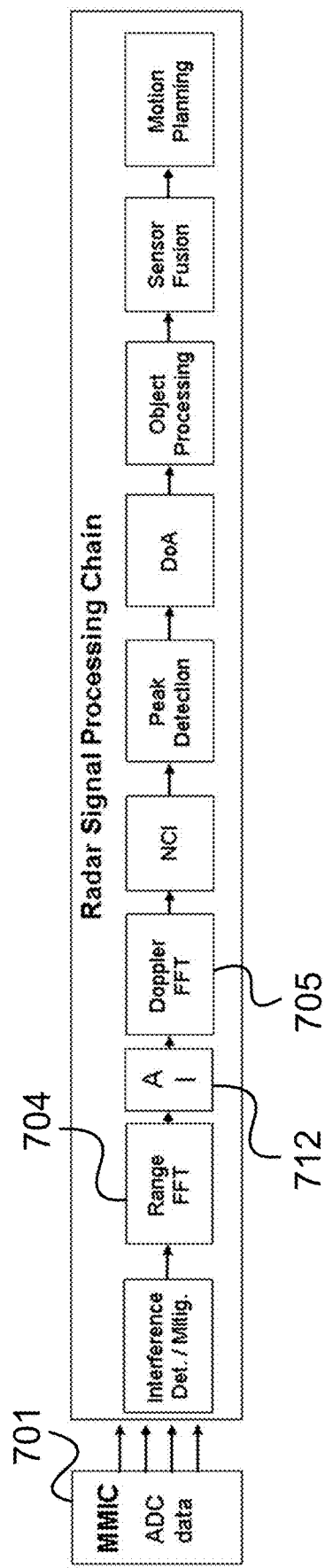
FIG. 7 illustrates the inclusion of an AI (artificial intelligence) processing into the radar signal processing chain of FIG. 4.

FIG. 7 illustrates the inclusion of an AI (artificial intelligence) processing 712 into the radar signal processing chain of FIG. 4 before the second FFT 705 (Doppler FFT).

For example the radar device 101 sends a first number of chirps (e.g. in a sparse sequence of chirps). Accordingly, the MMIC 701 only provides samples for the first number of chirps and the range FFT 704 provides, for each of these chirps (and per channel; this is not further mentioned in the following for simplicity) a vector of range FFT Fourier coefficients. This set of vectors (which may be seen as a compressed range FFT output in comparison to the output of a second, higher number of chirps, e.g. a sequence that is not sparse) is fed to the machine learning model 712. The machine learning model 712 calculates a Fourier coefficient vector, for each chirp of the second number of chirps for which the range FFT has not provided a Fourier coefficient vector. The Doppler FFT 705 then operates on the Fourier coefficient vector for all chirps of the second number of chirps (per channel).

The radar processing chain 702 may be partitioned in various ways. For example, the range FFT 704 may be performed by a radar sensor and the remainder of the radar processing chain 702 (starting with AI processing 712) may be carried out in another device (e.g. an ADAS device). By only having to transmit the range FFT output for the first number of chirps (which can be seen as reduced in comparison to the second number of chirps) the necessary bandwidth on the connection (e.g. bus) between the radar sensor and the ADAS device can be reduced.

So, before performing Doppler FFT, the output of the range FFT is processed by a machine learning model (e.g. a neural network) which generates a processed input which corresponds to an increased number of chirps by extra- and interpolation.

Figure 8:
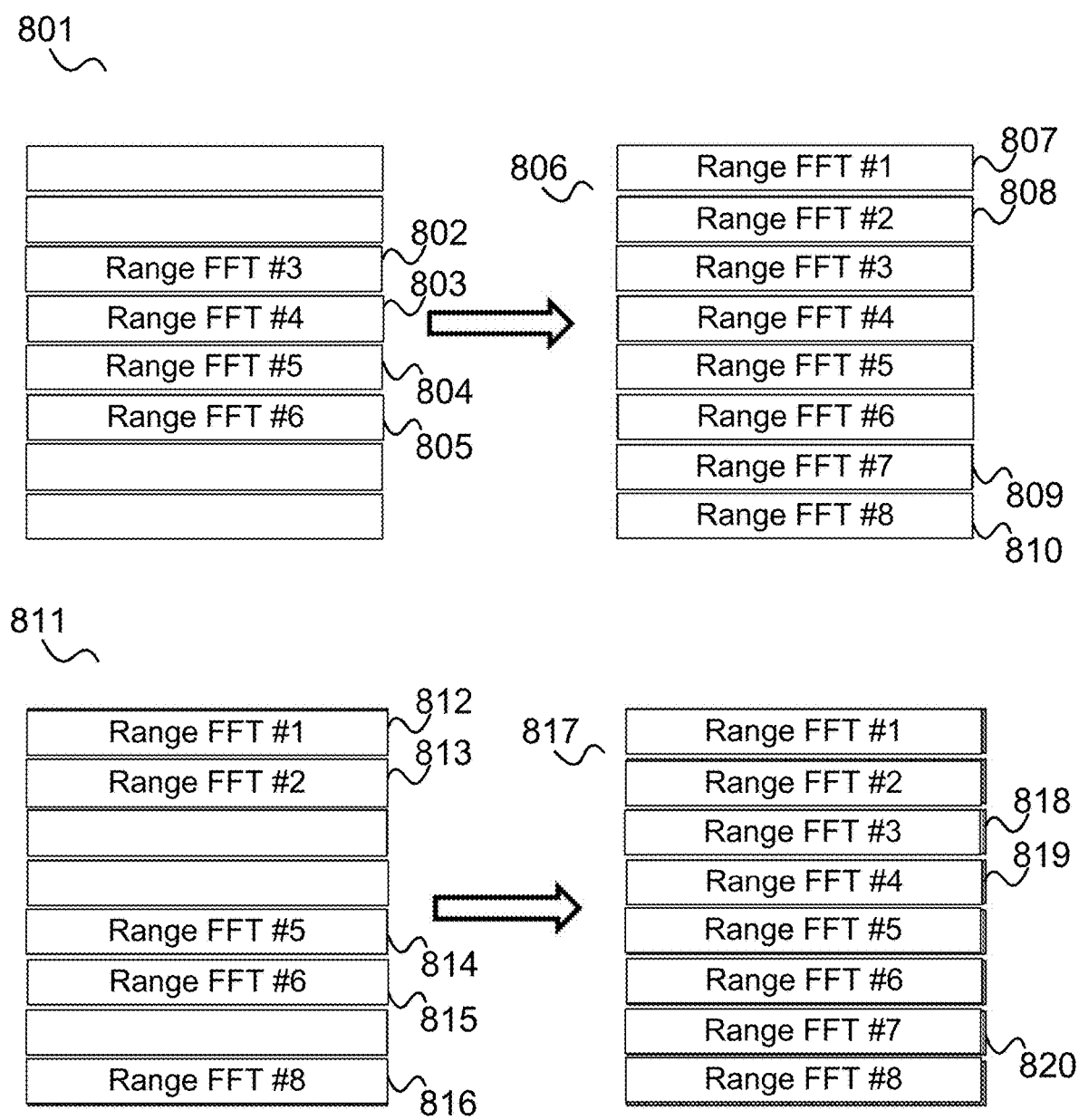
FIG. 8 illustrates extrapolation and interpolation of range FFT output data.

FIG. 8 illustrates this extrapolation and interpolation.

In an example illustrated by a first diagram 801, it is assumed that the range FFT output only provides a respective vector 802, 803, 804, 805 of range FFT coefficients for chirps #3, #4, #5 and #6 of a uniform sequence of chirps (#1 to #8).

The machine learning model 712 fills up this data by extrapolation to "full" Doppler FFT input data 806 for the Doppler FFT 705, i.e. generates range FFT coefficient vectors 807, 808, 809, 810, for chirps #1, #2, #7 and #8.

In an example illustrated by a second diagram 811, it is assumed that the range FFT output only provides a respective vector 812, 813, 814, 815, 816 of range FFT coefficients for chirps #1, #2, #5, #6 and #8 of the uniform sequence of chirps.

The machine learning model 712 fills up this data by interpolation to "full" Doppler FFT input data 817 for the Doppler FFT 705, i.e. generates range FFT coefficient vectors 818, 819, 820, for chirps #3, #4 and #7.

Training data for the machine learning model 712 (e.g. neural network) may be acquired via simulation (every corner case and every possible combination can be generated) or via real measurements or combination of both. A first option is to simulate ADC data (i.e. digitized radar signal samples) for a certain scene (i.e. with one or more target objects) and process the simulated ADC data to generate corresponding Doppler FFT input. A second option is to simulate Doppler FFT input directly for a scene.

For example, training data is generated by simulation runs with following parameters drawn from a random, uniform distribution:

| Number of targets | $x_0 = [1 \ldots n]$ |
|---|---|
| Velocity of targets | $x_1 = [-50 \text{ m/s}, 50 \text{ m/s}]$ |
| RCS (radar cross section) of the targets | $x_2 = [-5 \text{ dbsm}, 20 \text{ dbsm}]$ |
| SNR of targets | $x_3 = [5 \text{ dB}, 20 \text{ dB}]$ |

In the input to the neural network, a complex-valued matrix, e.g. $[C_0, C_1, C_2, C_3]$ in case of four chirps ($C_i$ is the vector of range FFT Fourier coefficients for chirp i), may be reordered into a real-valued vector, e.g. $[R_0, R_1, R_2, R_3, I_0, I_1, I_2, I_3]$ to keep the relationship between real and imaginary part (wherein $R_i$ contains the real values of the components of $C_i$ and $I_i$ the imaginary values).

The neural network may for example be (or include) an autoencoder or an MLP (multi-layer perceptron) or a recurrent neural network (RNN), e.g. with LSTM (long short-term memory)

The number of nodes of the input layer is equal to the number of components of the input matrix times two (complex values concatenated). The input matrix may include, for each chirp (for which the range FFT provides range FFT coefficients), the vector of range FFT coefficients. The input matrix may have placeholders for the chirps for which the neural network is supposed to generate range FFT coefficients (so, for example eight complex coefficient vectors, i.e. 16 real vectors for the example of FIG. 8 since the input data is supposed to be completely filled for all eight chirps).

The hidden layers of the neural network may be fully-connected layers with varying size and any activation function, e.g. ReLU.

The output layer is a regression layer with a number of nodes equal to the number of components of the output matrix times two (since again, complex values are split into two real values). Similar as for the input matrix, the output matrix may have vectors (e.g. rows) for all chirps (since the neural network may also update the data for the chirps for which the range FFT 704 provides FFT coefficients) or only vectors for the chirps for which the range FFT 704 does not provide FFT coefficients and for which range FFT coefficients should be generated by the AI processing 712.

Figure 9:
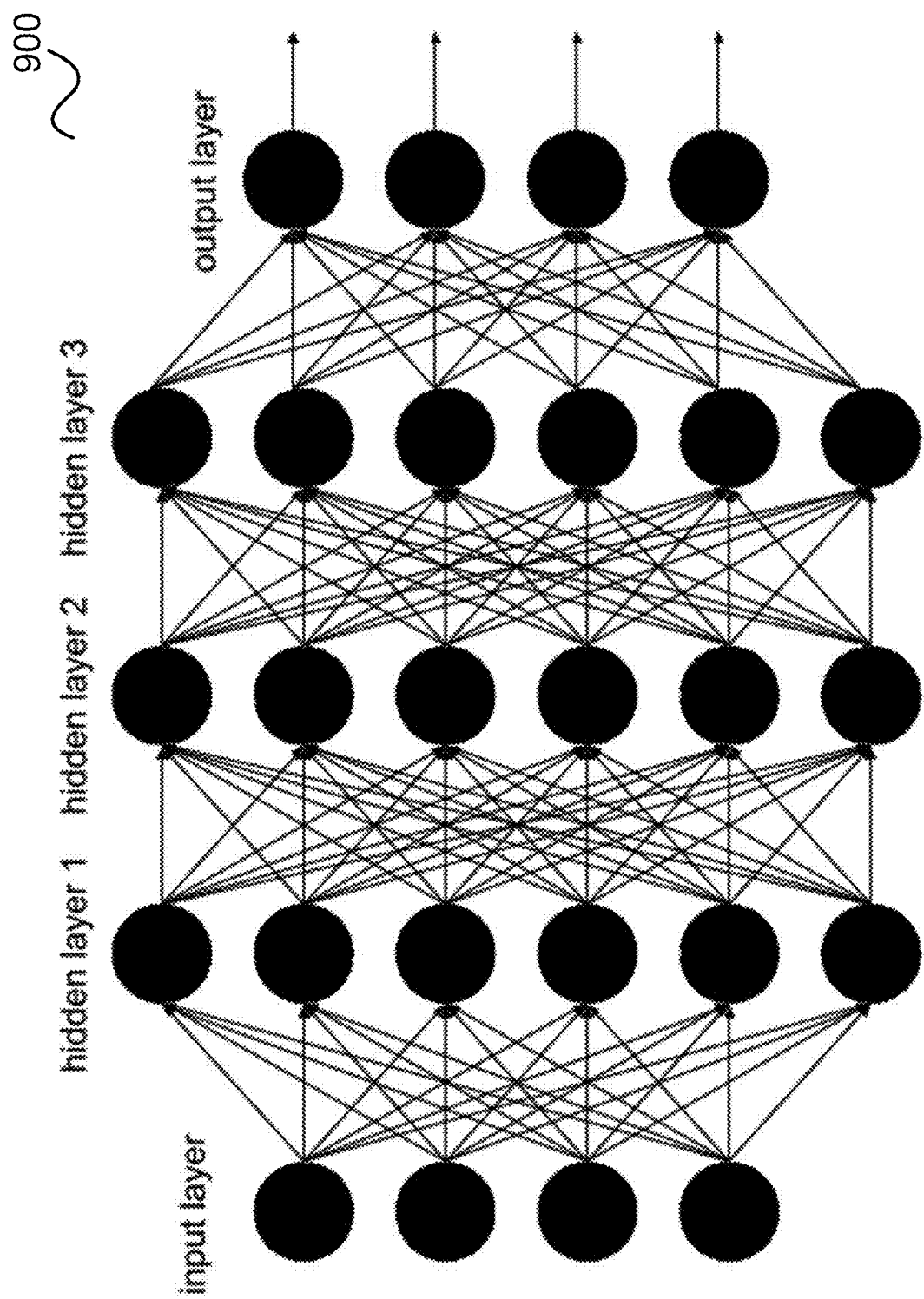
FIG. 9 shows an example of a neural network having an MLP (multi-layer perceptron) structure for extrapolation.

FIG. 9 shows an example of a neural network 900 having an MLP structure.

Figure 10:
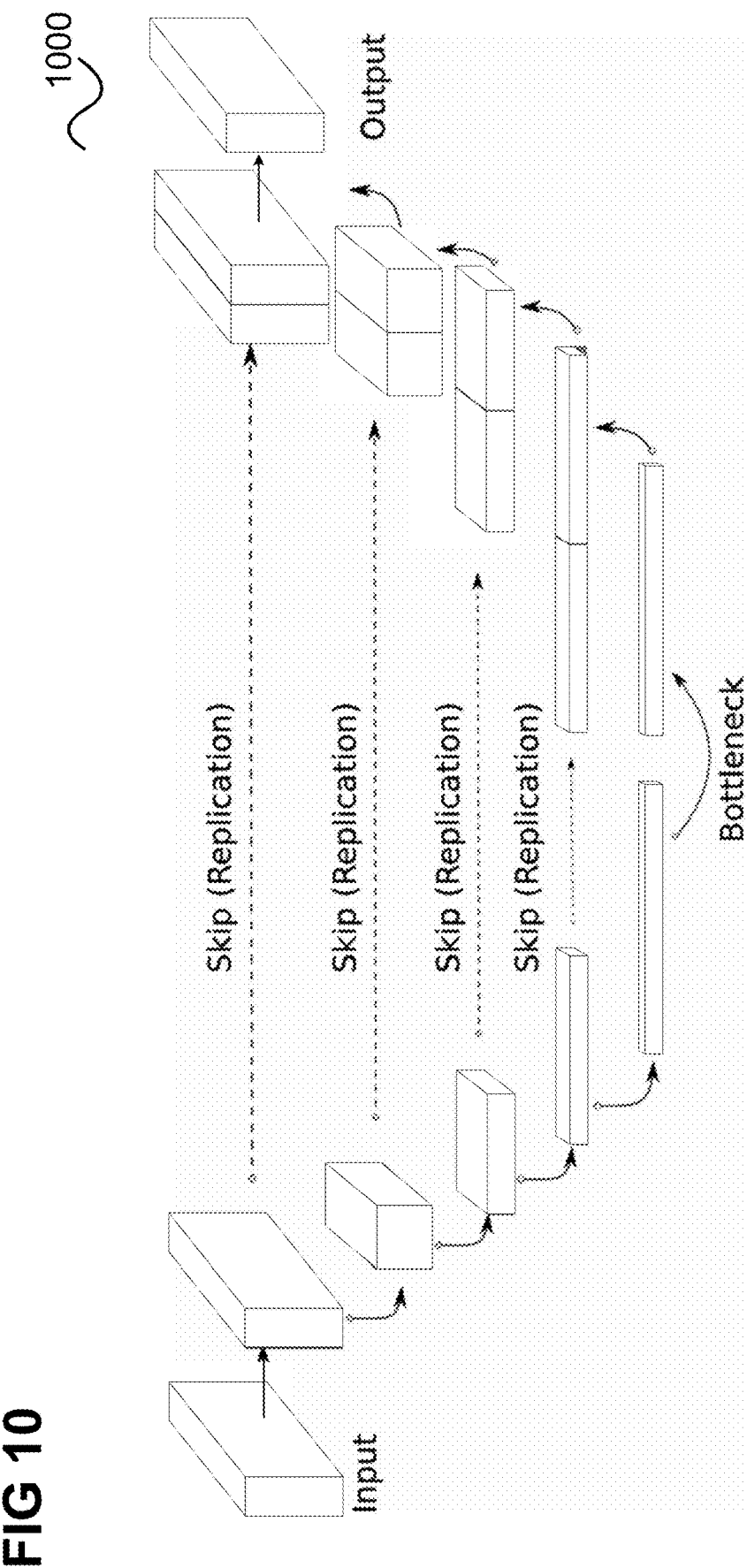
FIG. 10 shows an example of a neural network having a UNet structure.

FIG. 10 shows an example of a neural network 1000 having a UNet structure.

UNet is one exemplary neural network architecture with horizontal skip lines (not all information needs be represented in bottleneck layer).

For the UNet (or an autoencoder), the ground truth may be the ideal training data and the input incomplete or noisy training data. The autoencoder learns the relationship between ideal and incomplete or noisy data.

Figure 11:
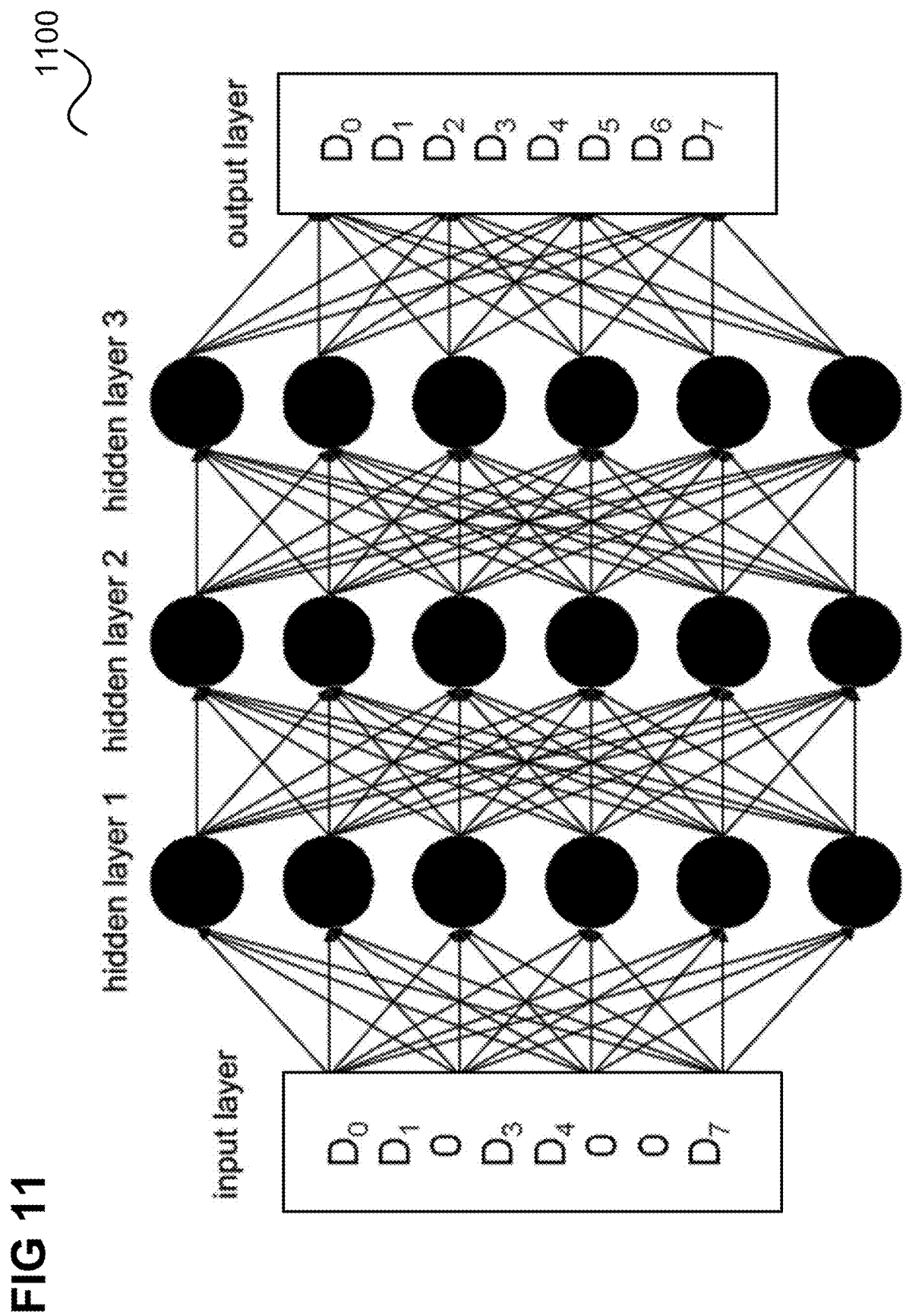
FIG. 11 illustrates training for a neural network having an MLP structure.

FIG. 11 illustrates training for a neural network 1100 having an MLP structure.

For training, data D is simulated or recorded for a full pattern of chirps (eight chirps in this example like in the examples of FIG. 8). $D_i$ is the vector of range FFT Fourier coefficients of chirp i. Then, the extrapolation or interpolation factor is set and the data for some chirps (#2, #5 , #6 in the example shown) is set to zero (i.e. range FFT result data for these chirps is zeroed). The neural network 1200 is then trained with Input: data with zeroed range FFT output data and random errors and noise Ground truth output: original data (with or without random errors and noise so the neural network 1100 may in addition be trained for error correction).

The neural network is thus trained to learn the relationship between zeroed range FFT result data and original range FFT result data.

Figure 12:
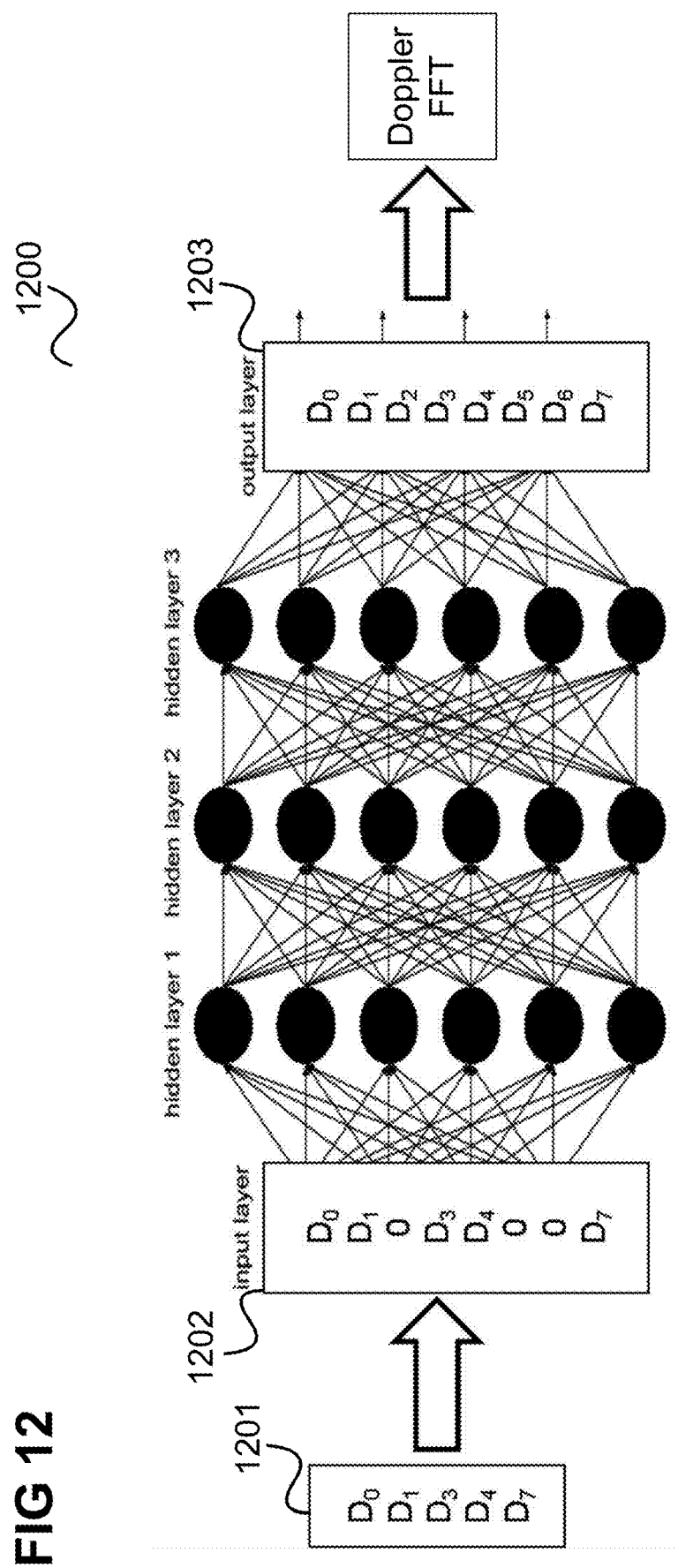
FIG. 12 illustrates inference for a neural network having an MLP structure trained as illustrated in FIG. 11.

FIG. 12 illustrates inference for a neural network 1200 having an MLP structure trained as illustrated in FIG. 11.

In this example, the AI processing input is range FFT output data 1201 for five chirps (i.e. a matrix including a vector of range FFT coefficients for each of five chirps). In the AI processing, the received data is zero-padded to an input matrix 1202 for the neural network 1200.

The neural network is applied (run) on this input matrix 1202 to produce an output matrix 1203 (with range FFT output data for eight chirps, i.e. +60% increase in elements). The output matrix 1203 is then supplied to the Doppler FFT.

It should be noted that in inference, the neural network (since it outputs the range FFT coefficients for the whole sequence of chirps) may modify (update) the existing measured values (i.e. those derived for chirps for which the range FFT 704 provides FFT coefficients).

Figure 13:
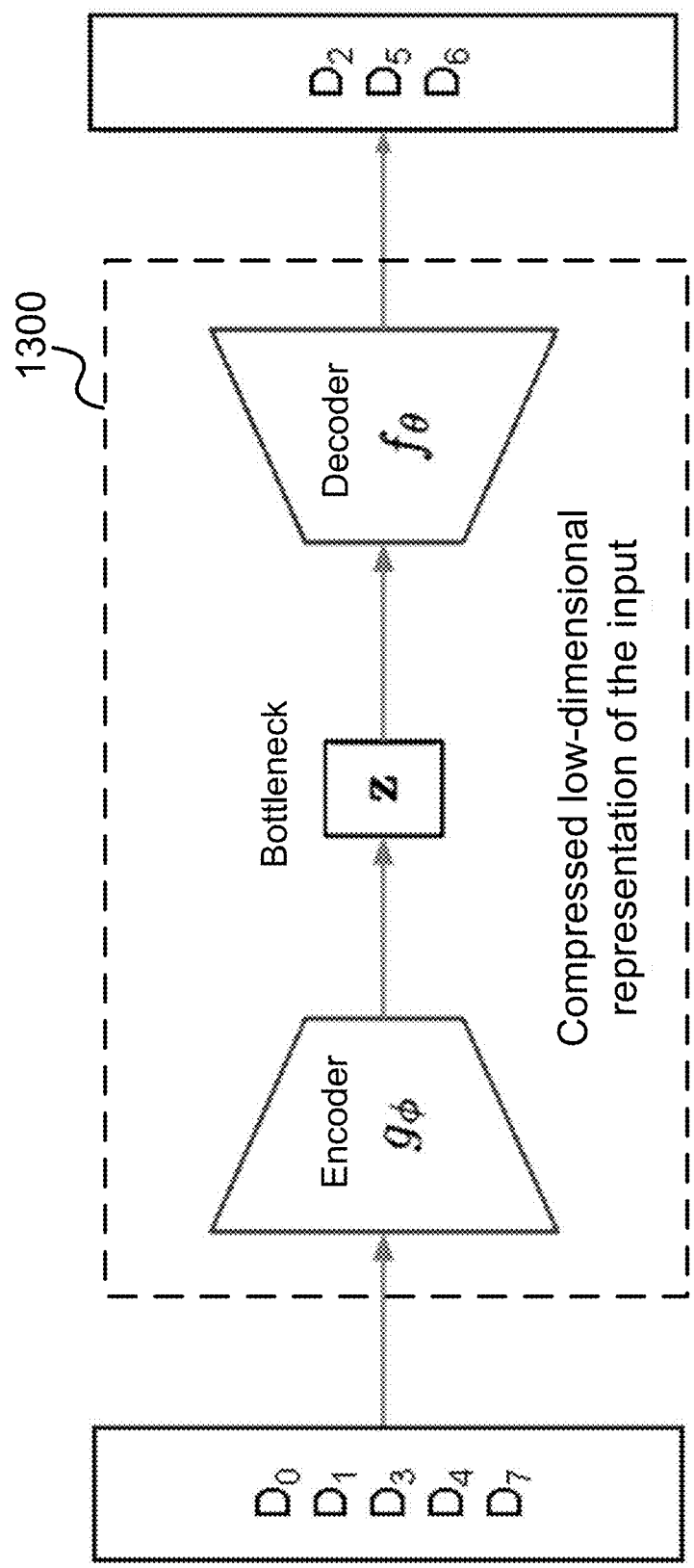
FIG. 13 illustrates training for a neural network with an autoencoder structure.
Figure 14:
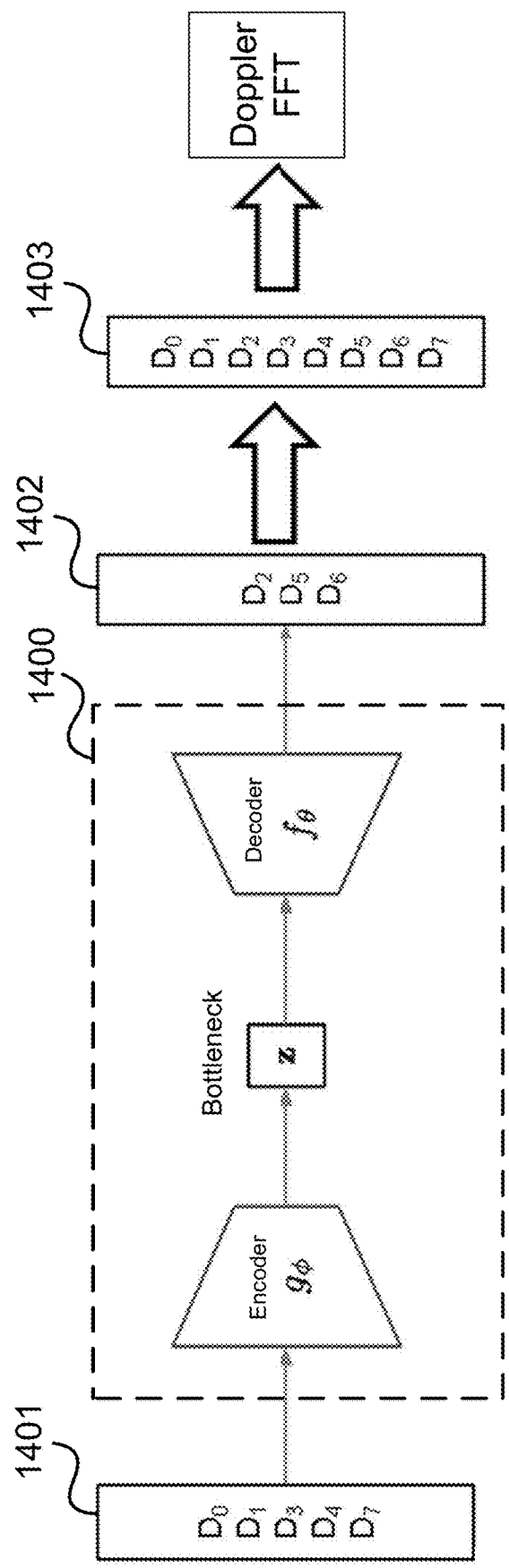
FIG. 14 illustrates inference for a neural network with an autoencoder structure trained as illustrated in FIG. 13.

Alternatively, the neural network may only provide data for the missing chirps (i.e. for which the range FFT 704 does not provide FFT coefficients). The network size can then be smaller (because of fewer input nodes and output nodes) but the existing data (for the chirps for which the range FFT 704 has provided FFT coefficients) is not updated. This is illustrated in FIGS. 13 and 14 for a neural network with an autoencoder structure but may also be applied to a neural network having an MLP structure. (On the other hand, the option of FIGS. 11 and 12 with zeroing and full output matrices may also be applied to a neural network with autoencoder structure).

FIG. 13 illustrates training for a neural network 1300 with an autoencoder structure.

For training, data D is simulated or recorded using a full sequence of chirps (eight chirps in this example). Then, the extrapolation or interpolation factor is set and the data for some chirps (#2, #5 , #6 in the example shown) is removed. The neural network 1300 is then trained with Input: data for selected chirps (i.e. without those which have been removed)

Ground truth output: removed data.

The neural network is thus trained to learn the relationship between selected and removed data.

FIG. 14 illustrates inference for a neural network 1400 with an autoencoder structure trained as illustrated in FIG. 13.

In this example, the AI processing input is data 1401 for five chirps (i.e. a matrix including a vector of range FFT coefficients for each of five chirps). This input data 1401 is also the input matrix for the neural network 1400.

The neural network is applied (run) on this input matrix 1401 to produce an output matrix 1402 having data for additional three chirps. The output matrix 1402 is put together with the input matrix 1401 to an input matrix 1403 for the Doppler FFT.

It should be noted that training may be performed by an external device. For example, the machine learning model may be trained by a computer and later be stored in a device implementing the AI processing. Nevertheless, the training device may be regarded as part of the radar system, even if it is external.

Figure 15:
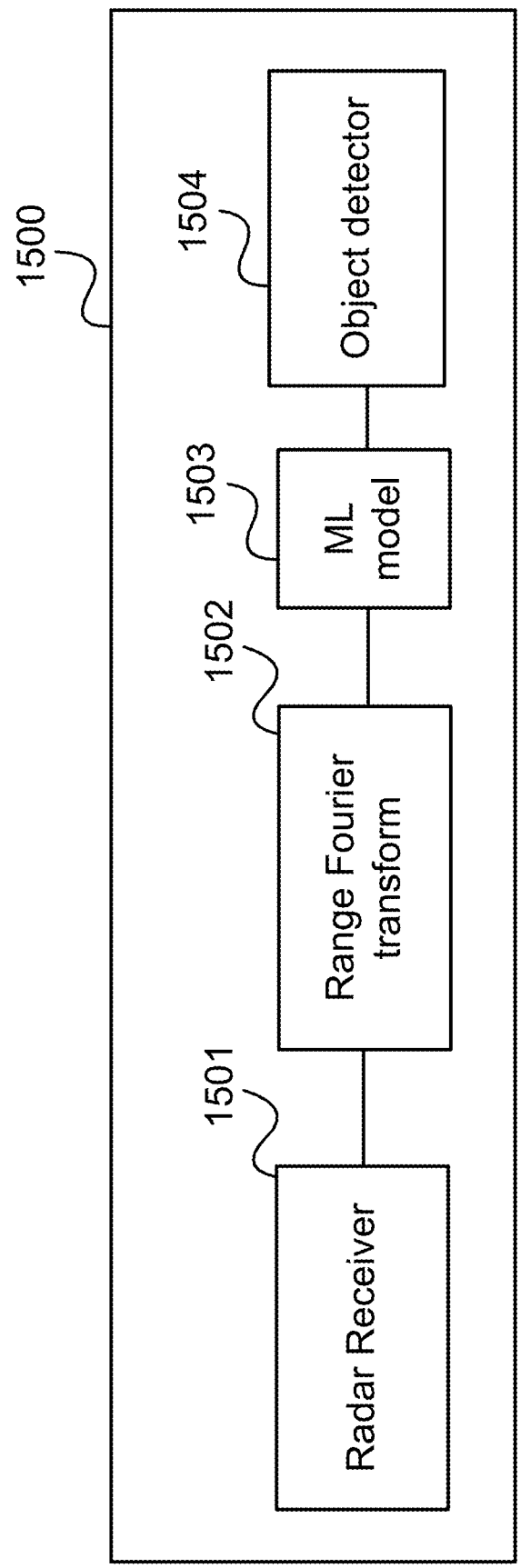
FIG. 15 shows a radar system according to an embodiment.

In summary, according to various embodiments, a radar system is provided as illustrated in FIG. 15.

FIG. 15 shows a radar system 1500 according to an embodiment.

The radar system 1500 includes a radar receiver 1501 configured to receive radio signals and a range Fourier transform stage 1502 configured to generate, for each of a plurality of chirps, a vector of range Fourier transform coefficients.

The radar system 1500 further includes a machine learning model 1503 configured to generate, for each of one or more additional chirps, a vector of range Fourier transform coefficients from the vectors of Fourier transform coefficients generated for the plurality of chirps, and an object detector 1504 configured to perform velocity estimation of one or more detected objects using the Fourier transform coefficients generated by the machine learning model.

According to various examples, in other words, Doppler FFT input data is supplemented by means of a neural network (trained for that purpose) such that the number of chirps for which Doppler FFT input data is available is increased.

According to various examples a method as illustrated in FIG. 16 is performed.

FIG. 16 shows a flow diagram illustrating a method for performing velocity estimation in a radar system.

In 1601, radio signals are received.

In 1602, for each of a plurality of chirps, a vector of range Fourier transform coefficients is generated.

In 1603, for each of one or more additional chirps, a vector of range Fourier transform coefficients is generated from the vectors of Fourier transform coefficients generated for the plurality of chirps.

In 1604 velocity estimation of one or more detected objects is performed using the Fourier transform coefficients generated by the machine learning model.

The method may be performed and the components of the radar system may be implemented by one or more processors. A "processor" may be understood as any kind of a logic implementing entity, which may be special purpose circuitry or a processor executing software stored in a memory, firmware, or any combination thereof. Thus a "processor" may be a hard-wired logic processor or a programmable logic processor such as a programmable processor, e.g. a microprocessor. A "processor" may also be a processor executing software, e.g. any kind of computer program. Any other kind of implementation of the respective functions which are described herein in more detail may also be understood as a "processor". The radar receiver, the range Fourier transform stage and the object detector may each be implemented by one or more circuits. For example, the object detector and the range Fourier transform stage may be implemented by the radar signal processing circuit 111. They may be part of radar signal processing chain, e.g. implemented by one or more microcontrollers.

The following examples pertain to further exemplary implementations.

Example 1 is a radar system as illustrated in FIG. 15.

Example 2 is the radar system of Example 1, wherein the object detector includes a Doppler Fourier transform stage configured to generate Doppler Fourier transform coefficients from the vectors of range Fourier transform coefficients for the plurality of chirps and for the one or more additional chirps and wherein the object detector is configured to perform the velocity estimation using the Doppler Fourier transform coefficients.

Example 3 is the radar system of Example 1 or 2, wherein each chirp of the plurality of chirps and the one or more additional chirps is associated with a respective chirp time of a sequence of chirp times and wherein the machine learning model is configured to generate, for each additional chirp, the vector of range Fourier transform coefficient for the chirp as if the chirp was sent at the chirp time associated with the additional chirp.

Example 4 is the radar system of Example 3, wherein the radar system is configured to transmit each chirp of the plurality of chirps at the chirp time associated with the chirp.

Example 5 is the radar system of Example 3 or 4, wherein the sequence of chirp times is a uniform sequence of chirp times.

Example 6 is the radar system of any one of Examples 3 to 5, wherein at least some of the additional chirps are associated with chirp times between chirp times associated with chirps of the plurality of chirps.

Example 7 is the radar system of any one of Examples 3 to 6, wherein at least some of the additional chirps are associated with chirp times before or after the chirp times associated with the chirps of the plurality of chirps.

Example 8 is the radar system of any one of Examples 1 to 7, wherein the machine learning model is configured to generate, for each of the one or more additional chirps, the vector of range Fourier transform coefficients from input data including the vectors of Fourier transform coefficients generated for the plurality of chirps, wherein the input data includes zero entries for the range Fourier transform coefficients for the one or more additional chirps and the machine learning model is configured to fill the zero entries with range Fourier transform coefficients for the one or more additional chirps.

Example 9 is the radar system of any one of Examples 1 to 8, wherein the machine learning model is a machine learning model configured to update the range Fourier transform coefficients for the plurality of chirps and the object detector is configured to perform velocity estimation of the one or more detected objects using the updated range Fourier transform coefficients for the plurality of chirps.

Example 10 is the radar system of any one of Examples 1 to 9, including a training device configured to train the machine learning model.

Example 11 is the radar system of Example 10, wherein the training device is configured to train the machine learning model by supervised learning wherein the training device is configured to generate ground truth data having a multiplicity of ground truth data elements by simulation of received radio signals and processing it to a range FFT output or simulating a range FFT output.

Example 12 is the radar system of Example 11, wherein each ground truth data element includes, for each of the one or more additional chirps, a ground truth vector of range Fourier transform coefficients.

Example 13 is the radar system of Example 12, wherein each ground truth data element additionally includes, for each of the one or more chirps, a ground truth vector of range Fourier transform coefficients.

Example 14 is the radar system of any one of Examples 11 to 13, wherein the training device is configured to generate the multiplicity of ground truth data elements by varying at least one of a number of targets of a scene for which the ground truth data elements are generated, locations of the respective number of targets in the scene, radar cross sections of the targets in the scene and random errors and noise and to train the machine learning model using the multiplicity of ground truth data elements.

Example 15 is the radar system of any one of Examples 1 to 14, wherein the machine learning model is a neural network.

Example 16 is the radar system of Example 15, wherein the machine learning model includes at least one of a multi-layer perceptron, an autoencoder and a recurrent neural network.

Example 17 is a method for performing velocity estimation in a radar system as illustrated in FIG. 16.

Example 18 is the method of Example 17, further including training the machine learning model.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

REFERENCE SIGNS 100 radar arrangement
101 radar device
102 antenna arrangement
103 radar control device
104 transmitter
105 duplexer
106 receiver
107 controller
108 object
109 transmit signal
110 echo
111 radar signal processing circuit
200 FMCW radar system
201 saw tooth waveform
202 oscillator
203 transmit antenna
204 receive antenna
205 mixer
206 low pass filter
207 spectrum analyzer
208 chirp
300 radar device
301 oscillator with ramper
302 transmit amplifiers
303 mixers
304 analog filters
305 ADCs
306 digital interface
307 radar signal processor
308 radar signal processing circuit
309 output interface
310 MMIC
311 power amplifier
312 transmit signal interface
401 MMIC
402 Radar signal processing chain
403-411 Radar processing
500 data cube
501 aggregate range/Doppler map
502 FFT peaks
503 receive antennas
601, 602 Diagrams
701 MMIC
704 Range FFT
705 Doppler FFT
712 AI processing
801 Diagram
802-805 Range FFT coefficient vectors
806 Doppler FFT input data
807-810 Range FFT coefficient vectors
811 Diagram
812-816 Range FFT coefficient vectors
817 Doppler FFT input data
818-820 Range FFT coefficient vectors
900 Neural network
1000 Neural network
1100 Neural network
1200 Neural network
1201 Input data
1202 Input matrix
1203 Output matrix
1300 Neural network
1400 Neural network
1401 Input data
1402 Output matrix
1500 Radar system
1501 Radar receiver
1502 Range Fourier transform stage
1503 Machine learning model
1504 Object detector
1600 Flow diagram
1601-1604 Processing

The invention claimed is:

1. A radar system, comprising:
A radar receiver configured to receive radio signals,
A range Fourier transform stage configured to generate, for each of a plurality of chirps, a vector of range Fourier transform coefficients,
A machine learning model configured to generate, for each of one or more additional chirps, a vector of range Fourier transform coefficients from the vectors of Fourier transform coefficients generated for the plurality of chirps, and
An object detector configured to perform velocity estimation of one or more detected objects using the Fourier transform coefficients generated by the machine learning model.

2. The radar system of claim 1, wherein the object detector comprises a Doppler Fourier transform stage configured to generate Doppler Fourier transform coefficients from the vectors of range Fourier transform coefficients for the plurality of chirps and for the one or more additional chirps and wherein the object detector is configured to perform the velocity estimation using the Doppler Fourier transform coefficients.

3. The radar system of claim 1, wherein each chirp of the plurality of chirps and the one or more additional chirps is associated with a respective chirp time of a sequence of chirp times and wherein the machine learning model is configured to generate, for each additional chirp, the vector of range Fourier transform coefficient for the chirp as if the chirp were sent at the chirp time associated with the additional chirp.

4. The radar system of claim 3, wherein the radar system is configured to transmit each chirp of the plurality of chirps at the chirp time associated with the chirp.

5. The radar system of claim 3, wherein the sequence of chirp times is a uniform sequence of chirp times.

6. The radar system of claim 3, wherein at least some of the additional chirps are associated with chirp times between chirp times associated with chirps of the plurality of chirps.

7. The radar system of claim 3, wherein at least some of the additional chirps are associated with chirp times before or after the chirp times associated with the chirps of the plurality of chirps.

8. The radar system of claim 1, wherein the machine learning model is configured to generate, for each of the one or more additional chirps, the vector of range Fourier transform coefficients from input data comprising the vectors of Fourier transform coefficients generated for the plurality of chirps, wherein the input data comprises zero entries for the range Fourier transform coefficients for the one or more additional chirps and the machine learning model is configured to fill the zero entries with range Fourier transform coefficients for the one or more additional chirps.

9. The radar system of claim 1, wherein the machine learning model is a machine learning model configured to update the range Fourier transform coefficients for the plurality of chirps and the object detector is configured to perform velocity estimation of the one or more detected objects using the updated range Fourier transform coefficients for the plurality of chirps.

10. The radar system of claim 1, comprising a training device configured to train the machine learning model.

11. The radar system of claim 10, wherein the training device is configured to train the machine learning model by supervised learning wherein the training device is configured to generate ground truth data having a multiplicity of ground truth data elements by simulation of received radio signals and processing the multiplicity of ground truth data to a range FFT output or simulating a range FFT output.

12. The radar system of claim 11, wherein each ground truth data element comprises, for each of the one or more additional chirps, a ground truth vector of range Fourier transform coefficients.

13. The radar system of claim 12, wherein each ground truth data element additionally comprises, for each of the one or more chirps, a ground truth vector of range Fourier transform coefficients.

14. The radar system of claim 11, wherein the training device is configured to generate the multiplicity of ground truth data elements by varying at least one of a number of targets of a scene for which the ground truth data elements are generated, locations of the respective number of targets in the scene, radar cross sections of the targets in the scene and random errors and noise and to train the machine learning model using the multiplicity of ground truth data elements.

15. The radar system of claim 1, wherein the machine learning model is a neural network.

16. The radar system of claim 15, wherein the machine learning model comprises at least one of a multi-layer perceptron, an autoencoder and a recurrent neural network.

17. A method for performing velocity estimation in a radar system, the method comprising:
Receiving radio signals;
Generating, for each of a plurality of chirps, a vector of range Fourier transform coefficients;
Generating, for each of one or more additional chirps, a vector of range Fourier transform coefficients from the vectors of Fourier transform coefficients generated for the plurality of chirps; and
Performing velocity estimation of one or more detected objects using the Fourier transform coefficients generated by the machine learning model.

18. The method of claim 17, further comprising training the machine learning model.

* * * * *